(12) United States Patent
Sakai

(10) Patent No.: US 8,188,168 B2
(45) Date of Patent: May 29, 2012

(54) TIRE RUBBER COMPOSITION

(75) Inventor: Hideyuki Sakai, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 13/022,684

(22) Filed: Feb. 8, 2011

(65) Prior Publication Data

US 2011/0207857 A1  Aug. 25, 2011

(30) Foreign Application Priority Data

Feb. 19, 2010  (JP) ................................. 2010-035112
Feb. 19, 2010  (JP) ................................. 2010-035124

(51) Int. Cl.
*C08K 11/00* (2006.01)
(52) U.S. Cl. ............................................. 524/9

(58) Field of Classification Search ................ 524/9, 13, 524/15
See application file for complete search history.

(56) References Cited

FOREIGN PATENT DOCUMENTS

| | | |
|---|---|---|
| JP | 1007841 Y2 | 1/1998 |
| JP | 2001123017 A | 5/2001 |
| JP | 2002069243 A | 3/2002 |
| JP | 2005162865 A | 6/2005 |
| JP | 2008024792 A | 2/2008 |
| JP | 2010163560 A | 7/2010 |

*Primary Examiner* — Peter Szekely
(74) *Attorney, Agent, or Firm* — Fish & Richardson P.C.

(57) ABSTRACT

An object thereof is to provide a tire rubber composition about which the ice braking-performance is largely improved while the tire-abrasion resistance is kept. In order to achieve the object, a tire rubber composition comprises a diene-based rubber component, and banana fiber in an amount of 0.1 to 20 parts by weight for 100 parts by weight of the diene-based rubber component.

6 Claims, No Drawings

TIRE RUBBER COMPOSITION

BACKGROUND OF THE INVENTION

1. Field of the Invention

The present invention relates to a tire rubber composition (i.e., a rubber composition for a tire), in particular, a tire rubber composition that can give compatibility between tire-abrasion resistance and ice braking-performance. The tire rubber composition according to the present invention is useful as a rubber composition for a studless tire.

2. Description of Related Art

In automobiles that run on icy road surfaces, studless tires, the tread portions of which are basically made of block-like material, are generally used. For a tread rubber which constitutes the tread portions, a method of incorporating a hard material, such as hollow particles, glass fiber or plant granules, thereinto is adopted in many cases in order to improve the grounding performance thereof onto icy road surfaces. For example, Patent document 1 describes a tire rubber composition into which plant granules subjected to surface treatment are incorporated, Patent document 2 describes a tire rubber composition into which a fraipontite-silica composite is incorporated, and further Patent document 3 describes a tire rubber composition into which a porous carbide of a plant is incorporated.

However, even when the above-mentioned hard material is incorporated thereinto, it is difficult to improve the braking performance on icy road surfaces (hereinafter referred to as the "ice braking-performance") while the tire-abrasion resistance is kept. Thus, there remains a room for a further improvement.

Patent document 4 describes a method of incorporating a non-woody fiber further into a silica-containing tread rubber composition for a tire, thereby decreasing the electrical resistance of the tread rubber. However, this patent document neither describes nor suggests a method of making the tire-abrasion resistance compatible with the ice braking-performance.

Patent document 5 describes a tire rubber composition into which crosslinked rubber particles and plant granules are incorporated. By the combination of the crosslinked rubber particles with the plant granules, a pneumatic tire produced from this tire rubber composition is largely improved in performance on ice and snow. However, a further improvement in the performance is requested in the market. In the actual circumstances, pneumatic tires having properties over the advantageous effects which these compositions produce are requested.

Patent document 1: JP-A-10-7841
Patent document 2: JP-A-2001-123017
Patent document 3: JP-A-2005-162865
Patent document 4: JP-A-2002-69243
Patent document 5: JP-A-2008-24792

SUMMARY OF THE INVENTION

In the light of the actual circumstances, the present invention has been made. An object thereof is to provide a tire rubber composition about which the ice braking-performance is largely improved while the tire-abrasion resistance is kept.

The inventors have made eager investigations about a method for removing a water membrane generated between a tire and an icy road surface small in frictional coefficient. The inventors have then paid attention to banana fiber, a very large quantity of which has been put into the discard as industrial waste, and found out that in a vulcanized rubber made of a rubber composition containing banana fiber, a porous structure that the banana fiber has contributes greatly to the removal of the water membrane. The inventors have also found out that in a vulcanized rubber made of a rubber composition containing crosslinked rubber particles, which may be referred to as a "rubber gel" hereinafter, together with the banana fiber, the water-membrane-removing effect produced by the banana fiber and a rubber-gel-productive effect of improving the cohesive frictional force of the tire onto a road surface are synergistically exhibited, thereby making it possible to make the tire-abrasion resistance and the ice braking-performance compatible with each other at a high level. The present invention has been made as a result of these investigations, and the above-mentioned object can be attained by the following:

The tire rubber composition according to the present invention comprises a diene-based rubber component, and banana fiber in an amount of 0.1 to 20 parts by weight for 100 parts by weight of the diene-based rubber component.

The rubber composition which contains the banana fiber is obtained by adding the banana fiber to the rubber component and then mixing these components with each other in an ordinary kneading manner or some other manner. The banana fiber in the rubber composition is in a fibril state and has a porous structure. In a tire obtained from the rubber composition according to the present invention, the banana fiber is exposed on the tire surface, so that the porous structure of the banana fiber attains the absorption or removal of water of a water membrane. As a result, the tire makes it possible to remove a water membrane on an icy road surface.

In a case where while a car having the tire runs, the banana fiber drops out from the tire, regions of the dropout turn microvoids. By a capillary phenomenon through the microvoids, the water membrane, which is generated between the road surface and the tire, can be removed. Additionally, an edge effect of edge portions of the microvoids also gives a scratching effect. The banana fiber is a natural product; therefore, it is needless to say that even when the fiber drops out or scatters from the tire, the fiber does not produce a large bad effect onto the environment or humane bodies.

The porous structure of the banana fiber, and the microvoids, which are generated in the banana-fiber-dropout regions, make it possible to remove effectively the water membrane which is generated between the tire and the road surface and causes slippage, and further exhibit the edge effect. For this reason, the use of the tire rubber composition according to the present invention makes it possible to improve the ice braking-performance largely while the tire-abrasion resistance is kept.

About the tire rubber composition, it is preferred that the average fiber width of the banana fiber is from 1 to 500 μm and the average fiber length thereof is from 0.1 to 5 mm. According to this structure, in the microvoids, which are generated in the banana-fiber-dropout regions, the water membrane generated between the tire and the road surface can be in particular effectively removed, and further the edge effect is more effectively exhibited.

In the tire rubber composition, it is preferred that plant granules are further contained in an amount of 0.1 to 20 parts by weight for 100 parts by weight of the diene-based rubber component. According to this structure, the effect of removing the water membrane generated between the tire and the road surface and a scratching effect based on the plant granules are synergistically exhibited, whereby the ice braking-performance can be further improved.

In the tire rubber composition, it is preferred that a porous carbide of a plant is further contained in an amount of 0.1 to 20 parts by weight for 100 parts by weight of the diene-based rubber component. According to this structure also, the effect of removing the water membrane generated between the tire and the road surface and a scratching effect based on the plant porous carbide are synergistically exhibited, whereby the ice braking-performance can be further improved.

In the tire rubber composition, it is preferred that crosslinked rubber particles (rubber gel) having an average particle diameter of 5 to 2000 nm and a glass transition point of −100 to −65° C. are further contained in an amount of 1 to 50 parts by weight for 100 parts by weight of the diene-based rubber component. When the rubber gel is incorporated together with the banana fiber into the composition, a synergetic action of the above-mentioned effects and cohesive frictional force caused by the rubber gel is produced, thereby making it possible to improve the ice braking-performance largely while the tire-abrasion resistance is maintained.

In the rubber-gel-containing tire rubber composition, it is preferred that plant granules are further contained in an amount of 0.1 to 20 parts by weight for 100 parts by weight of the diene-based rubber component. In the case of incorporating the plant granules together with the banana fiber and the rubber gel into the diene-based rubber component, the effect of removing the water membrane generated between the tire and the road surface, and the scratching effect based on the plant granules are synergistically exhibited, whereby the ice braking-performance can be further improved.

A tire yielded by vulcanizing and shaping the rubber composition according to the present invention is a tire about which the abrasion resistance and the ice braking-performance are compatible with each other; thus, the tire is useful, in particular, as a studless tire.

DETAILED DESCRIPTION OF THE PREFERRED EMBODIMENTS

Examples of the diene-based rubber component used in the tire rubber composition according to the present invention include natural rubber (NR), polyisoprene rubber (IR), polybutadiene rubber (BR), styrene butadiene rubber (SBR), butyl rubber (IIR), acrylonitrile butadiene rubber (NBR), and other diene-based synthetic rubbers. These diene-based rubbers may be used alone, or in the form of a blend composed of two or more thereof.

In the case of using, for example, NR and BR in the form of a blend thereof for a tread of a studless tire in the present invention, low-temperature properties of the rubber composition may be declined if the proportion of BR is too small. In contrast, if the proportion is too large, the workability or the tearing resistance of the composition may be deteriorated. Thus, the ratio of NR/BR is preferably from about 30/70 to about 80/20, more preferably from about 40/60 to about 70/30.

The banana fiber is obtained from a stem of any banana, and may be specifically produced by a method described in Japanese Patent No. 4125065. The banana fiber is in a fibril state in the rubber composition, and has a porous structure.

When the banana fiber is blended with the diene-based rubber component in the present invention, the average fiber width of the banana fiber and the average fiber length thereof are set preferably into the range of 1 to 500 μm and that of 0.1 to 5 mm, respectively, more preferably into the range of 10 to 70 μm and that of 1 to 2 mm, respectively. When the width and the length are adjusted into the ranges, the water membrane generated between the tire and the road surface can be in particular effectively removed in the microvoids, which are generated in the banana-fiber-dropout regions, by a capillary phenomenon through the microvoids. Additionally, a scratching effect is also exhibited by the edge effect of the edge regions of the microvoids.

The tire rubber composition according to the present invention may further contain plant granules. When the plant granules are together used, the ice braking-performance can be further improved by a synergetic action of the above-mentioned effect and a scratching effect of the plant granules.

The plant granules are granules obtained by pulverizing a plant moiety harder than ice, i.e., a plant moiety having a Mohs hardness of 2 or more in a known manner, examples of the plant moiety including husks of seeds of walnuts or camellia (or japonica), and nuclei of fruit such as peaches and plums. The plant granules project from the rubber surface, and produce a road-surface-scratching effect, thereby exhibiting an effect of preventing slippage on an icy road surface. In order to keep a certain adhesiveness of the granules onto the rubber, the granules are preferably plant granules surface-treated with an adhesiveness-to-rubber improver.

About the granular diameter of the plant granules, the diameter of the granules surface-treated with the adhesiveness-to-rubber improver is preferably from 100 to 600 μm. If the diameter is less than 100 μm, the quantity of granule-projections from the rubber surface is small so that the scratching effect is insufficient. If the diameter is more than 600 μm, the granules are larger than the diameter of bubbles contained in ice so that the granules become small in bubble-breaking effect. Additionally, the strain of the matrix rubber around the granules becomes excessive so that the rubber is cracked. As a result, the granules drop out easily from the tire surface.

The adhesiveness-to-rubber improver for the plant granules may be, for example, a mixture of an initial condensate of resorcin/formalin resin, and a natural rubber latex or diene-based synthetic rubber latex (the mixture: an RF treating liquid).

About the RF treating liquid, the solid concentration therein is adjusted into the range of 5 to 25% by weight so as to set the adhesion percentage thereof onto the plant granules into the range of 1 to 5% by weight. The plant granules are immersed into the RF treating liquid or the mixture is sprayed onto the plant granules, and then the resultant is dried, thereby yielding plant granules surface-treated with the adhesiveness-to-rubber improver. In a known manner, the surface-treated granules are again pulverized and the resultant particles are sieved into a desired particle size distribution.

In this way, plant granules having a predetermined particle diameter range are yielded.

When the plant granules are incorporated into the tire rubber composition according to the present invention, the content thereof in the composition is preferably from 0.1 to 20 parts by weight for 100 parts by weight of the diene-based rubber component. If the content is less than 0. 1 part by weight, the slippage resistance is poor on a frozen road surface. If the content is more than 20 parts by weight, the abrasion resistance is declined.

The tire rubber composition according to the present invention may further contain a porous carbide of a plant. When the plant porous carbide is used together, the ice braking-performance can be further improved by a synergetic action of the above-mentioned effects and a scratch effect of the carbide.

The plant porous carbide is a porous substance made of a solid product containing, as a main component thereof, carbon yielded by carbonizing a plant, such as a tree or bamboo, as a raw material. In particular, bamboo charcoal, exhibits an excellent absorptivity by porosity peculiar thereto; thus, bamboo charcoal effectively attains the absorption or removal of a water membrane generated on an icy road surface to heighten the frictional force between the road surface and the tire. Thus, the performance of the rubber composition on ice can be remarkably improved.

The bamboo material of bamboo charcoal may be a bamboo material that may be of various types, examples of which include moso bamboo (*Phyllostachysheterocycla f. pubescens*), Japanese timber bamboo or giant timber bamboo (*Phyllostachys bambusoides Sieb. et Zucc.*), henon bamboo or hachiku (*Phyllostachys nigra var. henonis*), and wrinkled bamboo (*Phyllostachys bambusoides f. marliacea*). The process for producing bamboo charcoal is a process of carbonizing the bamboo material, similarly to a process for producing a high-quality charcoal (called "binchotan" in Japanese). Use may be made of, for example, a bamboo charcoal yielded by carbonizing the bamboo material in the manner of baking the material in a kiln, as described as a bamboo-charcoal-producing process in JP-A-9-324180.

Bamboo charcoal is used in a granular form in the present invention. The usable bamboo charcoal is desirably a bamboo charcoal having a specific surface area of 150 $m^2/g$ or more, preferably 200 $m^2/g$ or more, more preferably 250 $m^2/g$ or more, the specific surface area being measured according to a iodine adsorption process (JIS K 6217). As this specific surface area is larger, the porosity of the bamboo charcoal is larger so that the water-absorbing rate thereof is larger. The upper limit of the specific surface area is not particularly limited as far as the granular form of the bamboo charcoal is not damaged. The specific surface area of commercially available products of binchotan is from about 100 to 130 $m^2/g$.

The granules of the bamboo charcoal used in the present invention may be granules yielded by the following method: a method of pulverizing a commercially available product of bamboo charcoal, the raw material of which is, for example, moso bamboo (*Phyllostachys heterocycla f. pubescens*), by means of a known pulverizer (such as a ball mill); and selecting or classifying, from the resultant particles, particles having particle diameters in a predetermined particle diameter range, for example, sifting, from the resultant particles, particles having predetermined particle diameters with a standard sieve described in JIS Z 8801.

The average particle diameter of the granules of the bamboo charcoal is preferably from 10 to 500 µm. If the average particle diameter is less than 10 µm, the absolute amount of absorbed water becomes small even when the specific surface area of the granules is large. Thus, the water-absorbing or water-removing effect becomes insufficient. If the average particle diameter is more than 500 µm, the dispersibility or workability thereof into the rubber, and the fracture property of the rubber are declined so that the abrasion resistance is deteriorated. Moreover, the granules easily drop out early by friction between the rubber and the road surface.

The shape of the bamboo charcoal is not particularly limited, and examples thereof include a substantially spherical shape, a substantially cubic shape, a substantially columnar shape, a needle shape and other various shapes; and a mixture of two or more of the shapes.

When the plant porous carbide is incorporated into the tire rubber composition according to the present invention, the content thereof is preferably from 0.1 to 20 parts by weight for 100 parts by weight of the diene-based rubber component. If the content is less than 0.1 part by weight, the slippage resistance on a frozen road surface is poor. If the content is more than 20 parts by weight, the abrasion resistance is declined.

The tire rubber composition according to the present invention may further contain crosslinked rubber particles (hereinafter referred to as the "rubber gel"). The ice braking-performance is largely improved by a synergetic action of the water-membrane-removing effect and the edge effect which are produced by the banana fiber, and a rubber-gel-productive effect of improving the cohesive frictional force of the tire onto a road surface.

When the rubber composition according to the present invention contains the rubber gel, the temperature dependency of the hardness of vulcanized rubber made of the rubber composition can be decreased in the range from a low temperature to normal temperature by the rubber gel. As a result, the cohesive frictional force of the tire, which contains the vulcanized rubber made of the rubber composition, can be improved. The average particle diameter (the DVN value according to DIN 53206) of the particles of the rubber gel is preferably from 5 to 2000 nm. From the viewpoint of the cohesive frictional force, the workability and the abrasion resistance of the rubber composition, the average particle diameter is more preferably from 20 to 600 nm, even more preferably from 40 to 200 nm.

About the rubber gel, the glass transition point (Tg) is preferably from −100 to −65° C., more preferably from −100 to −70° C. When the rubber gel having a low glass transition point as described herein is used, the cohesive-frictional-force-improving effect at low temperatures can be made higher. In other words, when the glass transition point is high, the elastic modulus of the tread rises in the range of low temperatures so that the effect of improving the ice braking-performance may be insufficient. The glass transition point is measured in accordance with JIS K 7121.

The rubber gel is a gelatinized rubber obtained by crosslinking a rubber-dispersed liquid. Examples of the rubber-dispersed liquid include any rubber latex produced by emulsion polymerization, any natural rubber latex, and any rubber-dispersed liquid obtained by emulsifying a rubber yielded by solution polymerization into water. Examples of a crosslinking agent used for the crosslinking include organic peroxides, organic azo compounds, and sulfur-containing crosslinking agents. The crosslinking of molecules of the rubber in the rubber-dispersed liquid may be attained by copolymerizing a polyfunctional compound having a crosslinking effect, during emulsion polymerization for producing the rubber, with the copolymerizable component(s). Specifically, the crosslinking may be conducted by use of a method disclosed in Japanese Patent No. 3739198, Japanese Patent No. 3299343, JP-T-2004-504465, JP-T-2004-506058, or some other document.

Examples of the rubber which constitutes the rubber gel include butadiene rubber (BR), styrene butadiene rubber (SBR), natural rubber (NR), isoprene rubber (IR), nitrile rubber (NBR), chloroprene rubber (CR), and other diene-based rubbers. The rubber is preferably butadiene rubber or natural rubber, or a blend rubber composed of the rubber and some other diene-based rubber.

About the rubber gel, the toluene swelling index Qi thereof is preferably from 1 to 15, more preferably from 1 to 10. When the rubber gel having such a toluene swelling index Qi is used, the effect of improving the cohesive frictional force at low temperatures can be made higher. About the rubber gel, the gel content by percentage therein is preferably 94% or more by weight.

The toluene swelling index and the gel content by percentage are each measured by a method including causing the rubber particles to swell in toluene, and then drying the particles. Specifically, 250 mg of the rubber particles are caused to swell in 25 mL of toluene for 24 hours while the system is shaken, and the system is subjected to centrifugal separation at 20000 rpm. The wet weight (W) of the particles is then measured. Next, the particles are dried at 70° C. until the mass thereof turns constant. Thereafter, the dry weight ($W_{dry}$) thereof is measured. The gel content by percentage is the ratio (%) by weight of the dried rubber particles to the used rubber particles. The toluene swelling index Qi is calculated out from the following equation: $Qi=W/W_{dry}$.

The rubber gel is in particular preferably a rubber gel which contains sulfur and a C=C double bond and is further modified with a compound having a OH (hydroxyl) group. In other words, it is particularly preferred to use a product obtained by modifying, with a compound having a OH group as a modifier, rubber particles wherein a diene-based rubber as a base rubber is crosslinked with sulfur. The modification is described in, for example, JP-T-2004-0506058, and examples of the modifier include hydroxybutyl acrylate or methacrylate, hydroxyethyl acrylate or methacrylate, and hydroxypropyl acrylate or methacrylate. In the case of using, as the rubber gel, a OH-group-modified product as described herein, which has a good affinity with the plant granules, the performance of the tire can be made better.

The rubber gel may be a rubber gel which is modified with a compound containing sulfur and having reactivity with a C=C double bond. The compound may be a compound capable of bonding chemically to the rubber gel through a sulfur-containing reactive group of the compound, such as a mercapto group, a dithiocarbamate or a xanthogenate. The modification can be attained by, for example, a method disclosed in Japanese Patent No. 3739198.

The rubber gel is blended with the diene-based rubber component preferably in an amount of 1 to 50 parts by weight for 100 parts by weight of the component. From the viewpoint of a more satisfactory restrain of a rise in the hardness of the rubber composition at low temperatures so as to make the performance on ice and snow high, the lower limit of the blend amount is more preferably 5 parts by weight, even more preferably 10 parts by weight. From the viewpoint of the restraint of a deterioration in the abrasion resistance, the upper limit thereof is more preferably 30 parts by weight, even more preferably 20 parts by weight.

Into the tire rubber composition according to the present invention may be incorporated a compounding component used ordinarily in the rubber industry together with the diene-based rubber component, the banana fiber, the plant granules, the plant porous carbide and the rubber gel as far as the advantageous effects of the present invention are not damaged. Examples of the compounding component include sulfur, carbon black, silica, a silane coupling agent, zinc flower (zinc oxide), stearic acid, a vulcanization accelerator, a vulcanization accelerator aid, a vulcanization retarder, an anti-ageing agent, a softening agent such as wax or oil, and a processing aid.

A usable species of sulfur may be an ordinary sulfur species for rubber, examples of which include powdery sulfur, precipitating sulfur, insoluble sulfur, and highly-dispersible sulfur. The sulfur content in the tire rubber composition according to the present invention is preferably from 0.5 to 2.0 parts by weight for 100 parts by weight of the diene-based rubber component.

When carbon black is used in a tread portion of a studless tire, a preferred species thereof is a species having a nitrogen absorptive specific surface area ($N_2SA$) of 70 $m^2/g$ or more and a DBP oil absorption of 105 mL/100 g or more from the viewpoint of the low-temperature performance and the abrasion resistance of the rubber composition, the performance of reinforcing the rubber, and others. A more preferred species thereof is a species having a $N_2SA$ of 80 to 200 $m^2/g$ and a DBP oil absorption of 110 to 150 mL/100 g. If these values are lower, the rubber strength and the modulus are declined. In contrast, if the $N_2SA$ is higher, the quantity of generated heat unfavorably increases.

Specific examples of the usable species of carbon black include carbon black species in grades of SAF, ISAF, and HAF. The blend amount thereof ranges from about 10 to 80 parts by weight for 100 parts by weight of the diene-based rubber component.

A usable species of silica may be wet silica, dry silica, surface-treated silica, or the like. The blend amount thereof is preferably less than 50 parts by weight for 100 parts by weight of the diene-based rubber component from the viewpoint of the balance between the tanδ of the rubber and the blend amount, the reinforcing performance of silica, and the electrical conductivity of the rubber composition. The total amount of carbon black and silica is preferably from about 10 to 120 parts by weight therefor.

The vulcanization accelerator may be a vulcanization accelerator usable ordinarily for rubber vulcanization, examples thereof including sulfenamide-based, thiuram-based, thiazole-based, thiourea-based, guanidine-based, and dithiocarbamate-based vulcanization accelerators. These may be used alone or in the form of an appropriate mixture of two or more thereof.

The anti-ageing agent may be an anti-ageing agent usable ordinarily for rubber, examples thereof including aromatic-amine-based, amine/ketone-based, monophenol-based, bisphenol-based, polyphenol-based, dithiocarbamate-based, and thiourea-based anti-ageing agents. These may be used alone or in the form of an appropriate mixture of two or more thereof.

The tire rubber composition of the present invention is yielded, using an ordinary mixing machine usable in the rubber industry, such as a Banbury mixer, a kneader or a roll to mix or knead the diene-based rubber component, the banana fiber, the plant granules, the plant porous carbide, the rubber gel, and one or more optional compounding components used ordinarily in the rubber industry, such as sulfur, carbon black, silica, a silane coupling agent, zinc flower (zinc oxide), stearic acid, a vulcanization accelerator, a vulcanization accelerator aid, a vulcanization retarder, an anti-ageing agent, a softening agent such as wax or oil, and a processing aid.

The method for blending the individual components with each other is not particularly limited, and may be any one selected from the following: a method of kneading the compounding components other than the vulcanization-related components, such as sulfur and the vulcanization accelerator, in advance so as to prepare a master batch, adding the other components to the master batch, and further kneading all the components; a method of adding the individual components in any adding-order to a mixing machine, and then kneading all the components; a method of adding all the components simultaneously to a mixing machine, and then kneading the components; and other methods.

A tire can be produced by using the tire rubber composition according to the present invention to produce a tread rubber of a tire by means of a known apparatus such as an extruder for rubber, shaping the tread rubber into an unvulcanized tire, and then vulcanizing the shaped tire in a known manner. The resultant tire is a tire compatible between abrasion resistance and ice braking-performance. Thus, the tire is useful, in particular, as a studless tire.

About the rubber composition of the present invention, the JIS hardness (measured at 23° C. according to JIS K 6253) thereof is adjusted desirably into the range of 30 to 60, more desirably into that of 45 to 55 in order to keep the low-temperature performance of the rubber composition on icy road surfaces.

EXAMPLES

Hereinafter, a description will be made about examples demonstrating the structure and the advantageous effects of the present invention specifically, and others. Evaluating items in the examples and the others are the following items (1) to (3):

(1) Rubber Hardness

Each of rubber compositions of Examples and Comparative Examples was vulcanized at 150° C. for 30 minutes, and the rubber hardness of the vulcanized rubber was measured at 23° C. in accordance with JIS K 6253. The evaluation results are shown in Table 1.

(2) Abrasion Resistance

Produced were studless tires (195/65R15) in each of which each of the rubber compositions was arranged in a tread. The tires were fitted to a front-wheel drive car (4WD) having a piston displacement of 2000 cc. Whenever the car was run at a distance of 2,500 km on an ordinary dry road surface, the front tires were substituted with the rear tires. After the car was run at a distance of 10,000 km, the abrasion amount of the tires was analyzed from the average of the respective depths of the grooves remaining in the treads of the four tires. On the basis of the abrasion amount, the abrasion resistance of the tires was evaluated. Each of the results is represented as an index relative to the result of Comparative Example 1 that is represented as 100. As the numerical value is larger, the abrasion resistance is better. The evaluation results are shown in Table 1.

(3) Ice Braking-Performance

Produced were studless tires (195/65R15) in each of which each of the rubber compositions was arranged in a tread. The tires were fitted to a front-wheel drive car having a piston displacement of 2000 cc. The car was preliminarily run at a distance of 100 km on an ordinary dry road surface. Thereafter, on an icy road surface having a road surface temperature of −3 ±3° C. at an air temperature of −5±3° C., the ABS of the car was operated when the car speed was 40 km/h. At this time, the braking distance was measured. On the basis of the average of the braking distances measured 10 times repeatedly, the ice braking-performance was evaluated. Each of the results is represented as an index relative to the result of Comparative Example 1 that is represented as 100. As the numerical value is larger, the braking distance is shorter, which is better. The evaluation results are shown in Table 1.

(Preparations of Rubber Compositions)

In accordance with each blending formulation (each of Examples 1 to 12 and Comparative Examples 1 to 7) shown in Table 1, diene-based rubber components (amount: 100 parts by weight), and other blending components were blended with each other. These components were then kneaded by use of an ordinary Banbury mixer so as to prepare each rubber composition. Each of the rubber components and blending components shown in Table 1 is as follows:

a) Diene-Based Rubber Components:
   (1) natural rubber (NR): RSS#3, and
   (2) polybutadiene rubber (BR): High cis BR "BR01", manufactured by JSR Corp.,
b) Carbon black N339: "SEAST KH", manufactured by Tokai Carbon Co., Ltd.,
c) silica: NIP SEAL AQ, manufactured by Nippon Silica Industrial Co., Ltd.,
d) Silane coupling agent: "Si75", manufactured by Degussa GmbH,
e) paraffin oil: "PROCESS P200", manufactured by Japan Energy Corp.,
f) banana fiber: a banana fiber yielded by cutting a commercially available product in a known manner (average fiber width: 10 to 70 μm, and average fiber length: 1 to 2 mm),
g) plant granules: plant granules (average particle diameter: 300 μm) yielded by pulverizing commercially available walnut husks ("SOFT GRIT #46", manufactured by Nippon Walnut Co., Ltd.), and then surface-treating the pulverized husks with an RF treating liquid,
h) crosslinked rubber particles (rubber gel): "MICRO-MORPH 30B" (average particle diameter: 130 nm, toluene swelling index Qi: 5.9, gel content by percentage: 97% by weight, and Tg: −80° C.) manufactured by Rhein Chemie GmbH, which is a rubber gel made basically of a butadiene rubber and is a product modified with hydroxybutyl methacrylate,
i) stearic acid: "LUNAC S-20", manufactured by Kao Corp.,
j) zinc flower: "Zinc Flower No. 1 (AENKAISSYU)", manufactured by Mitsui Mining & Smelting Co., Ltd.,
k) anti-ageing agent: "ANTIGEN 6C", manufactured by Sumitomo Chemical Co., Ltd.,
l) wax: "OZOACE 0355", manufactured by Nippon Seiro Co., Ltd.,
m) vulcanization accelerator: "SOXINOL CZ", manufactured by Sumitomo Chemical Co., Ltd., and
n) sulfur: powdery sulfur, manufactured by Tsurumi Chemical Co., Ltd.

TABLE 1

| | | Comparative example 1 | Comparative example 2 | Comparative example 3 | Example 1 | Example 2 | Example 3 | Example 4 | Comparative example 4 | Example 5 | Example 6 | Example 7 |
|---|---|---|---|---|---|---|---|---|---|---|---|---|
| <Blend> | | | | | | | | | | | | |
| Diene-based rubber components | NR | 50 | 50 | 50 | 50 | 50 | 50 | 50 | 50 | 50 | 50 | 50 |
| | BR | 50 | 50 | 50 | 50 | 50 | 50 | 50 | 50 | 50 | 50 | 50 |
| Carbon black | | 25 | 25 | 25 | 25 | 25 | 25 | 25 | 25 | 25 | 25 | 25 |
| Silica | | 25 | 25 | 25 | 25 | 25 | 25 | 25 | 25 | 25 | 25 | 25 |
| Silane coupling agent | | 2 | 2 | 2 | 2 | 2 | 2 | 2 | 2 | 2 | 2 | 2 |
| Paraffin oil | | 20 | 20 | 20 | 20 | 20 | 20 | 20 | 20 | 20 | 20 | 20 |
| Plant granules | | — | 5 | — | — | — | — | — | — | 3 | — | 3 |

TABLE 1-continued

|  | Comparative example 1 | Comparative example 2 | Comparative example 3 | Example 1 | Example 2 | Example 3 | Example 4 | Comparative example 4 | Example 5 | Example 6 | Example 7 |
|---|---|---|---|---|---|---|---|---|---|---|---|
| Plant porous carbide | — | — | 5 | — | — | — | — | — | — | 3 | 3 |
| Banana fiber | — | — | — | 5 | 0.1 | 10 | 20 | 30 | 3 | 3 | 3 |
| Stearic acid | 2 | 2 | 2 | 2 | 2 | 2 | 2 | 2 | 2 | 2 | 2 |
| Zinc flower | 2 | 2 | 2 | 2 | 2 | 2 | 2 | 2 | 2 | 2 | 2 |
| Anti-ageing agent | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 | 1.5 | 1.5 | 1.5 |
| Sulfur | 2.1 | 2.1 | 2.1 | 2.1 | 2.1 | 2.1 | 2.1 | 2.1 | 2.1 | 2.1 | 2.1 |
| <Evaluations> | | | | | | | | | | | |
| Rubber hardness | 50 | 50 | 51 | 51 | 51 | 52 | 54 | 58 | 51 | 52 | 52 |
| Abrasion resistance | 100 | 96 | 95 | 96 | 102 | 94 | 92 | 70 | 96 | 95 | 93 |
| Ice braking-performance | 100 | 109 | 110 | 119 | 106 | 123 | 131 | 133 | 122 | 124 | 134 |

TABLE 2

|  |  | Comparative example 5 | Example 8 | Example 9 | Example 10 | Comparative example 6 | Comparative example 7 | Example 11 | Example 12 |
|---|---|---|---|---|---|---|---|---|---|
| <Blend> | | | | | | | | | |
| Diene-based rubber components | NR | 50 | 50 | 50 | 50 | 50 | 50 | 50 | 50 |
|  | BR | 50 | 50 | 50 | 50 | 50 | 50 | 50 | 50 |
| Carbon black | | 25 | 25 | 25 | 25 | 25 | 25 | 25 | 25 |
| Silica | | 25 | 25 | 25 | 25 | 25 | 25 | 25 | 25 |
| Silane coupling agent | | 2 | 2 | 2 | 2 | 2 | 2 | 2 | 2 |
| Paraffin oil | | 20 | 20 | 20 | 20 | 20 | 20 | 20 | 20 |
| Crosslinked rubber particles (rubber gel) | | 15 | 15 | 15 | 45 | 60 | 15 | 15 | 15 |
| Plant porous carbide | | 2 | — | — | — | — | — | 3 | 3 |
| Banana fiber | | — | 2 | 10 | 10 | 10 | 25 | 5 | 10 |
| Stearic acid | | 2 | 2 | 2 | 2 | 2 | 2 | 2 | 2 |
| Zinc flower | | 2 | 2 | 2 | 2 | 2 | 2 | 2 | 2 |
| Anti-ageing agent | | 2 | 2 | 2 | 2 | 2 | 2 | 2 | 2 |
| Wax | | 2 | 2 | 2 | 2 | 2 | 2 | 2 | 2 |
| Vulcanization accelerator | | 1.5 | 1.5 | 1.5 | 1.5 | 1.5 | 1.5 | 1.5 | 1.5 |
| Sulfur | | 2.1 | 2.1 | 2.1 | 2.1 | 2.1 | 2.1 | 2.1 | 2.1 |
| <Evaluations> | | | | | | | | | |
| Rubber hardness | 23° C. | 48 | 49 | 49 | 50 | 51 | 49 | 49 | 49 |
|  | −5° C. | 49 | 50 | 50 | 51 | 52 | 50 | 50 | 50 |
| Abrasion resistance | | 100 | 101 | 97 | 95 | 78 | 82 | 99 | 96 |
| Ice braking-performance | | 100 | 106 | 113 | 116 | 118 | 116 | 112 | 115 |

From the results shown in Table 1, it is understood that about the studless tires yielded from the tire rubber compositions of Examples 1 to 7, respectively, the abrasion resistance and the ice braking-performance were compatible with each other. By contrast, it is understood that about the studless tires of Comparative Examples 2 and 3, which contained no banana fiber, the ice braking-performance were not improved, and the abrasion resistance and the ice braking-performance were unable to be compatible with each other. It is also understood that about the studless tire of Comparative Example 4, which contained a large amount of the banana fiber, the rubber hardness increased so that the abrasion resistance was deteriorated.

From the results shown in Table 2, it is understood that about the studless tires yielded from the tire rubber compositions of Examples 8 to 12, respectively, the abrasion resistance and the ice braking-performance were more satisfactorily compatible with each other than about the studless tire yielded from the tire rubber composition of Comparative Example 5. By contrast, it is understood that about the studless tire of Comparative Example 6, which contained an excessively large amount of the banana fiber, the abrasion resistance was deteriorated. It is also understood that about the studless tire of Comparative Example 7, which contained an excessively large amount of the rubber gel, the abrasion resistance was deteriorated as well.

What is claimed is:

1. A tire rubber composition comprising a diene-based rubber component, and banana fiber in an amount of 0.1 to 20 parts by weight for 100 parts by weight of the diene-based rubber component.

2. The tire rubber composition according to claim 1, wherein the average fiber width of the banana fiber is from 1 to 500 μ and the average fiber length thereof is from 0.1 to 5 mm.

3. The tire rubber composition according to claim 1, wherein plant granules are further contained in an amount of 0.1 to 20 parts by weight for 100 parts by weight of the diene-based rubber component.

4. The tire rubber composition according to claim 1, wherein a porous carbide of a plant is further contained in an amount of 0.1 to 20 parts by weight for 100 parts by weight of the diene-based rubber component.

5. The tire rubber composition according to claim 1, wherein crosslinked rubber particles (rubber gel) having an average particle diameter of 5 to 2000 nm and a glass transition point of −100 to −65° C. are further contained in an amount of 1 to 50 parts by weight for 100 parts by weight of the diene-based rubber component.

6. The tire rubber composition according to claim 5, wherein plant granules are further contained in an amount of 0.1 to 20 parts by weight for 100 parts by weight of the diene-based rubber component.

* * * * *

UNITED STATES PATENT AND TRADEMARK OFFICE
CERTIFICATE OF CORRECTION

PATENT NO. : 8,188,168 B2
APPLICATION NO. : 13/022684
DATED : May 29, 2012
INVENTOR(S) : Hideyuki Sakai Page 1 of 1

It is certified that error appears in the above-identified patent and that said Letters Patent is hereby corrected as shown below:

Column 14, line 3, (Claim 5, line 3), delete "25".

Signed and Sealed this
Thirtieth Day of October, 2012

David J. Kappos
*Director of the United States Patent and Trademark Office*